United States Patent
Currie

(12) 
(10) Patent No.: US 10,855,568 B2
(45) Date of Patent: *Dec. 1, 2020

(54) AUTOMATED SURVEY GENERATOR FOR PROVISIONING INFRASTRUCTURE

(71) Applicant: EMC IP Holding Company LLC, Hopkinton, MA (US)

(72) Inventor: John Currie, Chapel Hill, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,529

(22) Filed: Jun. 13, 2019

(65) Prior Publication Data

US 2019/0296995 A1    Sep. 26, 2019

Related U.S. Application Data

(63) Continuation of application No. 15/088,018, filed on Mar. 31, 2016, now Pat. No. 10,326,679.

(51) Int. Cl.
*G06F 15/173* (2006.01)
*H04L 12/26* (2006.01)
*H04L 29/08* (2006.01)
*H04L 12/24* (2006.01)

(52) U.S. Cl.
CPC .......... *H04L 43/10* (2013.01); *H04L 41/0806* (2013.01); *H04L 41/5025* (2013.01); *H04L 41/5048* (2013.01); *H04L 41/5051* (2013.01); *H04L 41/5067* (2013.01); *H04L 67/10* (2013.01); *H04L 41/5096* (2013.01)

(58) Field of Classification Search
USPC ....................................... 709/224, 221, 202
See application file for complete search history.

(56) References Cited

U.S. PATENT DOCUMENTS

2008/0104393 A1   5/2008  Glassier et al.
2012/0173305 A1   7/2012  Bhaskaran et al.

*Primary Examiner* — Lan Dai T Truong
(74) *Attorney, Agent, or Firm* — Workman Nydegger

(57) ABSTRACT

An automated security survey generator for provisioning services in a cloud environment. Services, including infrastructure services, provided by the cloud are provisioned from blueprints. A survey is attached to each of the blueprints. When a service is provisioned, the attached survey is executed such that questions are presented to a requestor. Responses to the questions and actions are evaluated and actions associated with the responses are performed. The survey can prevent the service from being provisioned.

20 Claims, 5 Drawing Sheets

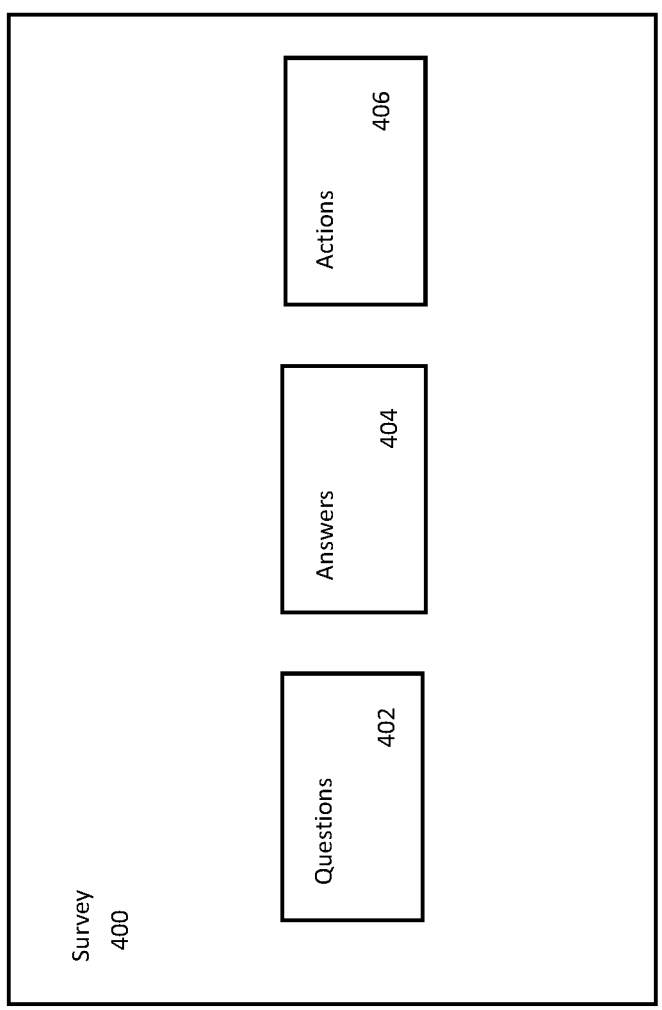

AUTOMATED SURVEY GENERATOR FOR PROVISIONING INFRASTRUCTURE

FIELD OF THE INVENTION

Embodiments of the invention relate to systems and methods for providing services in a computing environment. More particularly, embodiments of the invention relate to systems and methods for provisioning services in a computing environment such as a cloud environment.

BACKGROUND

Computing environments such as cloud environments can provide users with various types of services. A cloud environment typically refers to the hardware, networking, storage, applications, services, and other components that can be used by various users. A public cloud, for example, may be used by multiple unrelated users and a private cloud is typically used by a single set of related users (or single entity). A hybrid cloud may refer to a combination of a private cloud and a public cloud.

Cloud environments are often used to provide Infrastructure as a Service (IaaS). Using a cloud environment effectively shields users or entities from the details of the infrastructure. While using a cloud environment, a user or entity may make a request for a certain service. For example, a user may request a virtual machine, storage, an application, or other service available from the cloud environment. A cloud environment can be used to provide big data processing, backup services, virtual machines, applications, storage including big data storage, or the like.

One of the problems with cloud environments relates to the need to provision or deploy services. If the services of the cloud are manually provisioned, it becomes more difficult to adequately meet the needs of users. Further, the services of the cloud cannot be dynamically managed in an efficient manner. When the services of the cloud are accessed in a self-service manner, it becomes more difficult to enforce security and ensure that the services comply with various rules and regulations. Services and methods are needed to securely provision services requested by users or entities.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4 illustrates an example of a survey executed when evaluating a request for services of the cloud;

DETAILED DESCRIPTION OF SOME EXAMPLE EMBODIMENTS

Figure 1:
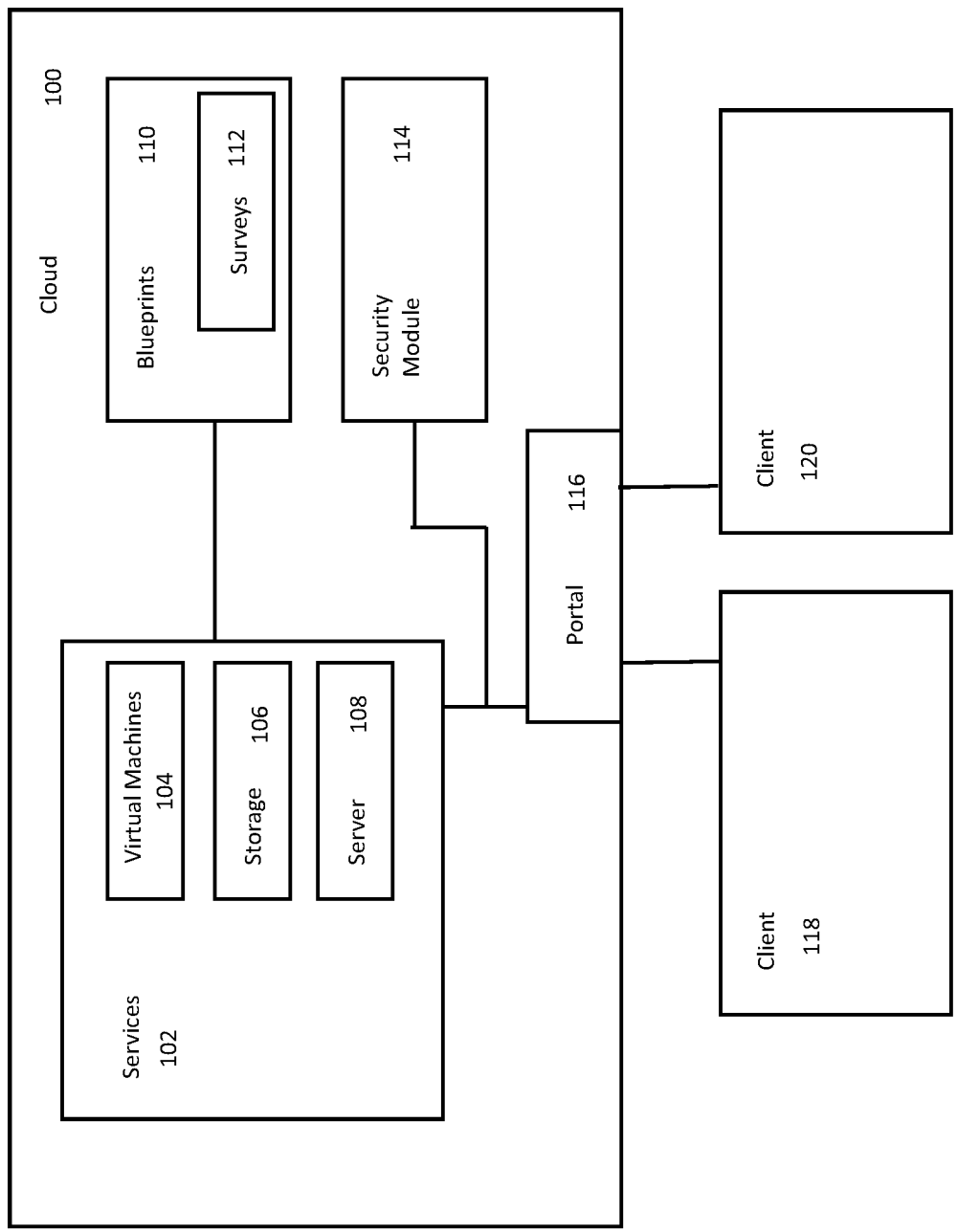
FIG. 1 is an example of a cloud environment that is configured to automatically provision services while administering security for the services.

Embodiments of the invention relate to systems and methods for providing services in a computing environment such as a cloud environment (e.g., public, private, and/or hybrid cloud). Embodiments of the invention further relate to systems and methods for providing security while provisioning the services provided by the cloud environment.

In one example, the services provided by a cloud may include Infrastructure as a Service (Iaas), Platform as a Service (PaaS), and/or Software as a Service (SaaS). IaaS may include virtualization services and may include deploying and provisioning virtual machines. The services provided by a cloud may be provided in a self-service manner. For example, a request for a service can be received and fulfilled automatically. Systems and methods are provided for automating security responses to provisioning requests.

The security associated with the deployment and provisioning of services in the cloud is improved by having the user fill out a survey during the provisioning process. More specifically, embodiments of the invention can improve the security associated with providing services by automatically generating a survey that is presented to the requestor when the service (e.g., the infrastructure) is provisioned. Security responses to the provisioning request can be orchestrated based on the responses of the requestor to the survey. Security responses or actions may include, but are not limited to, blocking the provisioning request, sending an email to a designated recipient, fulfilling the provisioning request, partially fulfilling the provisioning request, or the like.

Embodiments of the invention include a security module (e.g., executable code stored on a storage device) that can be used by a user (e.g., a security administrator) to specify the text associated with a survey. The text may include both questions and potential answers for each question. Usually, the questions are presented as multiple choice answers. The questions and set of possible answers, as well as actions to be automatically enforced based on user selection of specific answers, are bundled together as a survey. The survey is attached to a provisioning blueprint, which is used to provision a requested service. Each service may be associated with a different blueprint and with a different survey. Thus, the survey associated with a blueprint for provisioning a virtual machine may be different from the survey associated with provisioning storage or an application or other service.

When a service is requested by a requestor, the survey associated with or attached to the blueprint of the service is presented to the requestor prior to provisioning the requested service. Thus, the survey may be attached to or stored separately from the blueprint and may be accessed based on the service requested in the provisioning request.

When the survey is completed, a survey execution engine may review the results and take any actions specified in the survey that are associated with the requestor's responses. Thus, the actions may depend on the responses (selected answers) to the questions presented in to the survey. Further, the survey execution engine may also attach the results of the survey to the provisioned service. When a virtual machine is instantiated, for example, the results or responses are included with the virtual machine (e.g., as properties) as metadata. The metadata can be ingested or reviewed by a security compliance module or component to evaluate the services that have been provisioned by the cloud. The security compliance module can review the responses at the time of provisioning. The security compliance module can also search the metadata of all deployed or provisioned services and obtain a holistic view of the deployed services.

FIG. 1 illustrates an example of a cloud environment that includes a security module configured to present a survey in response to a provisioning request and orchestrate a response based on the results of the survey. The security module may also be configured to create the survey.

FIG. 1 illustrates a cloud 100 (e.g., a public cloud, a private cloud, a hybrid cloud). The cloud 100 is configured to provide services 102. The services 102 provided by the cloud may include IaaS, PaaS, and/or SaaS. FIG. 1 illustrates, by way of example only and not limitation, IaaS services such as virtual machines 104, storage 106, servers 108, or the like. The infrastructure included in the services 102 may include other hardware or infrastructure components. Any of the services 102 may be associated with a blueprint and survey.

Each of the services 102 may be associated with a blueprint included in the blueprints 110. The blueprints 110 include information that indicate how to provision the requested service. For example, when provisioning a virtual machine in response to a provisioning request, the corresponding blueprint is accessed in order to provision the virtual machine for a requestor such as the client 118 (or user thereof). The blueprint may identify certain requirements such as processor requirements, operating system, applications, disk size, and the like. FIG. 1 further illustrates that each of the blueprints 110 is associated with at least one of the surveys 112. Each blueprint is typically associated with one survey.

Figure 2:
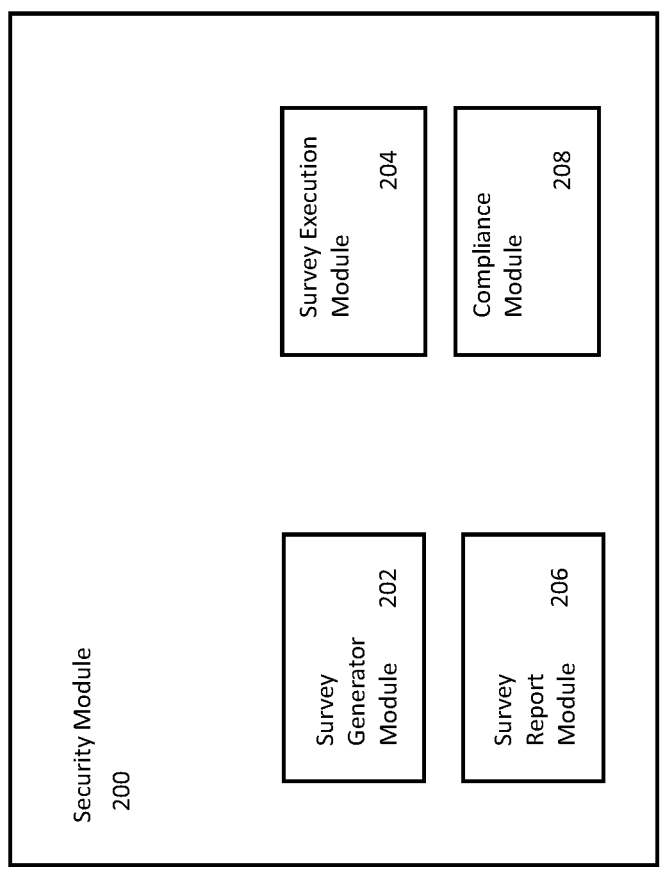
FIG. 2 is an example of a security module included in the cloud environment.

FIG. 1 also illustrates a security module 114. The security module 114 is configured to create the surveys 112, execute the surveys 112, orchestrate workflows resulting from responses to the surveys, and the like. FIG. 2, for example, illustrates a security module 200, which is an example of the security module 114. The security module 200 includes a survey generator module 202 that is configured to create surveys and a survey execution module 204 that is configured to execute the surveys (e.g., present the surveys to users and record the responses of the requestor) and orchestrate workflows related to execution of the survey. The security module 200 also includes a survey report module 206 that is configured to report results to a compliance module 208. The compliance module 208 is configured to ingest survey results (the responses of the requestor) and may ensure that the services provisioned by the cloud 100 comply with applicable rules or regulations.

With reference to FIGS. 1 and 2, the generation and execution of surveys is discussed. A client 120, for example, may be associated with a security administrator (or other user) associated with an entity accessing the cloud 100 or a security administrator (or other user) associated with the cloud 100. The client 120 accesses the cloud 100 via a portal 116 in one example. The portal 116 may provide a user interface for the client 120 and for other clients. The user interface is typically displayed to the user.

In response to user input, the security generator module 202 may generate the survey. The client (or user) initially specifies the service for which the survey is being created (or amended if a survey already exists). The client 120 may specify, for example, that a survey is being created for the provisioning of virtual machines. The survey generator module 202 presents a user interface, based on information received from the survey generator module 202, that allows a user to specify text such as questions and potential answers to the questions that are to be included in the survey. Each question may be associated with one or more answers. The answer or answers selected by a requestor become the response to the survey. After the survey is generated, the survey generator module 202 attaches the survey to the provisioning blueprint for the virtual machine.

In one example, the information for the survey may be collected through input fields in a user interface. This information may then be stored as custom properties or as metadata that is associated with the blueprint of the service. In one example, the survey is attached to the blueprint by extending the blueprint with custom properties.

In one example, the custom properties may be implemented as a key value pair. Each of the properties may include a property and a value. One pair may include a requestor name property and the person's name or logon identification. The questions may constitute the properties and the user selected answer or answers may be the values.

For example, using these custom properties, each property may represent a question on the survey. For example, Question 1 is property 1, question 2 is property 2, etc. Each property is associated with values that include answers and/or actions. When creating the survey, a workflow may be used. The workflow may include presenting a user with a set of data entry fields for the properties (e.g., questions) and corresponding entries for the values (e.g., answers). Each data entry field used to receive the questions may be associated with multiple data entry field configured to receive the answers. Each of the data entry fields used to receive answers may be associated with one or more additional data entry fields for identifying actions. This allows specific actions or workflows to be associated with each answer. In this manner, specific security responses can be performed when the responses to the questions are collected. The text entered during this workflow are then converted to or stored as properties that are associated with the blueprint. This allows a specific survey to be associated with specific services and allows surveys to be automatically generated and presented in response to provisioning requests for specific services. In other words, a request for a virtual machine results in the presentation of a survey that may be different from a survey presented in response to a request for storage or other service provided by the cloud.

When the survey is executed or presented (for example during the process of provisioning a virtual machine or other service), the properties of the survey stored with or associated with the blueprint can be used to generate and present the survey to the requestor. When presenting the survey, the questions and answers are extracted from the properties associated with the blueprint and presented in a user interface. In one example, the survey is presented in a multiple choice format. The survey can be configured to allow a requestor to select only one answer or more than one answer. For example, the answers may be presented to the user in a drop down menu, using checkboxes, radio buttons, or other input mechanisms.

Figure 3:
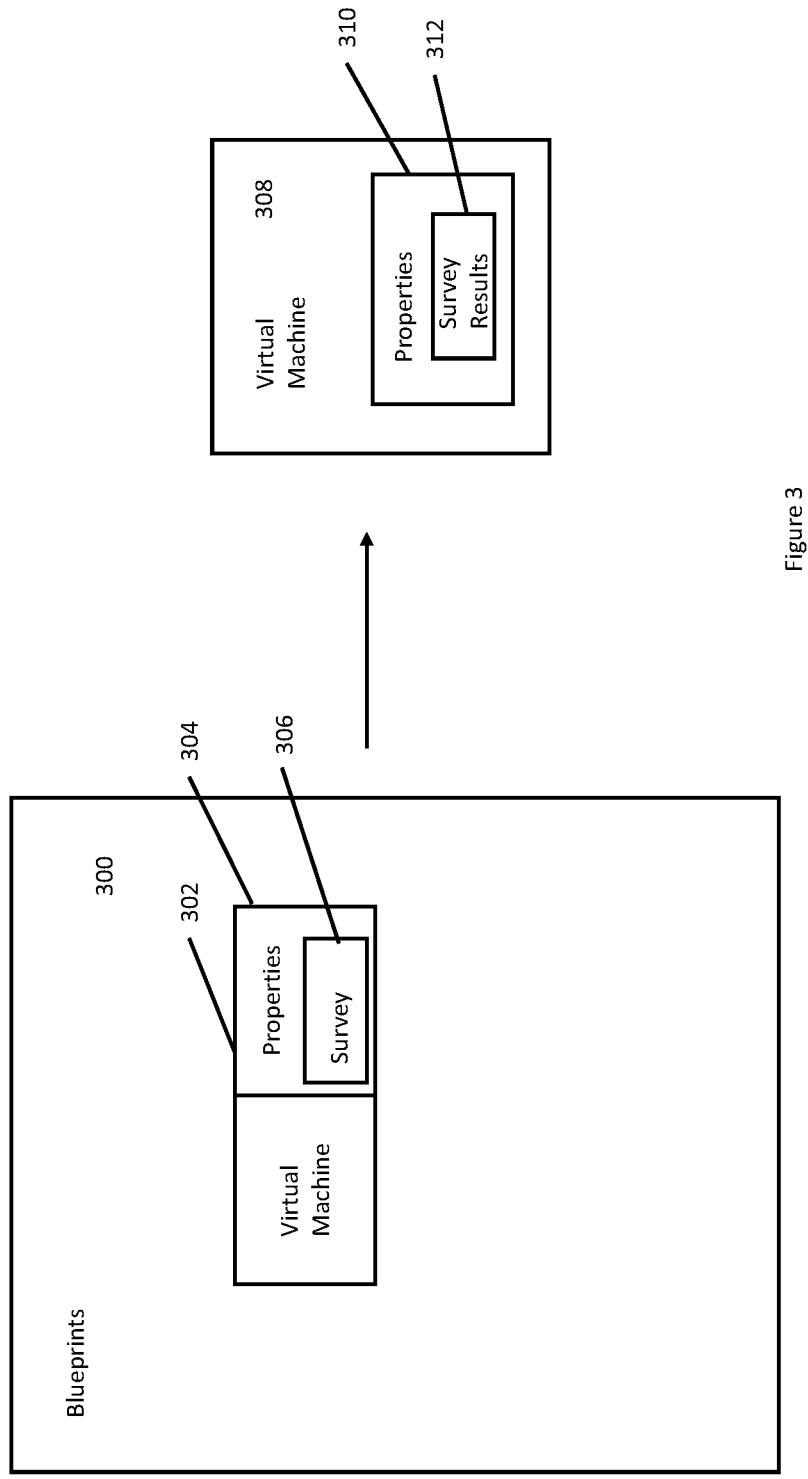
FIG. 3 is an example of a blueprint used to provision a service and illustrates an example of the service provisioned in accordance with the blueprint.

FIG. 3 illustrates an example of a blueprint for a service and illustrates and example of a service provisioned according to the blueprint. FIG. 3 illustrates blueprints 300 and the blueprints 300 include a blueprint 302 for a virtual machine. Although only a virtual machine blueprint 302 is illustrated, blueprints for other services may be included in the blueprints 300. In FIG. 3, the virtual machine blueprint 302 is associated with properties 304. The properties 304 include a survey 306. In one example, the survey 306 is included in the blueprint 302 as properties that can be used to generate a survey in a user interface for a requestor.

When a request for a virtual machine (or other service) is received, the provisioning process examines the blueprint 302 and determines that the survey 306 is present in ore associated with the blueprint 302. At this point, if the responses to the survey generated from the properties 304 and presented to the requestor do not prevent the service from being provisioned, the virtual machine is provisioned.

FIG. 3 illustrates a virtual machine 308, which is an example of a virtual machine provisioned from the blueprint 302. When the virtual machine 308 is provisioned during the provisioning process, the responses or survey results 312 are included in the metadata or properties 310 of the virtual machine 308. The results 312 can be searched over time by the compliance module 208.

FIG. 4 illustrates an example of a survey 400. The survey may be created by an appropriate user (e.g., a security administrator) and then presented automatically in response to a provisioning request. This allows the cloud 100 to be self-service and allows security to be enforced automatically.

The survey 400 includes one or more of questions 402, answers 404 and actions 406. After being created, the survey 400 may be stored in the properties of a blueprint, for example. When the survey execution module executes the survey, the questions 402 and answers are presented to a requestor in a user interface, for example. The survey execution module extracts the questions 402 and the answers 404 from the blueprint and arranges the questions 402 and the answers 404 in the user interface. The questions 403 may be presented in text and the answers can be presented in a selectable manner using user interface elements such as drop down menus, radio buttons, or the like. When input from the requestor is received identifying specific answers (responses or results), the results are stored with the provisioned service. Further, the results may be used to drive the actions 406. More specifically, the results can identify which of the actions 406, if any, are to be executed. Some of the answers 404 may not be associated with any actions while other answers may be associated with specific answers. In one example, the absence of an action is interpreted as authorization to proceed with provisioning the service. A survey may include multiple questions. The following table provides an example question 402, answers 404 associated with the question 402, and actions 406 associated with the answers:

| Question | Answers | Actions |
|---|---|---|
| US citizen? | Yes | Grant Provisioning Request |
|  | No | Block Provisioning Request |

In this example, a "Yes" (the selected answer or response) can result in a "Grant Provisioning Request" action. Alternatively, no action may be specified for a "Yes" response and the requested service will still be provisioned. A "No" response results in an action "Block Provisioning Request" that prevents the requested service from being provisioned.

Each question in the survey 400 may be associated with multiple answers and each answer may be associated with one or more actions. The survey may be configured such that only one response is allowed per question. However, the survey may be configured to allow multiple responses for a single question.

In one example, the security module may perform conflict resolution. For example, the responses to two questions in the survey may result in incompatible actions. In this case, all potential actions associated with the survey results are reviewed and the conflict may be resolved automatically. In one example, one of the questions may have precedence over the other questions and the action with the higher priority or precedence is selected. In another example, the conflict is referred to an administrator for resolution.

Figure 5:
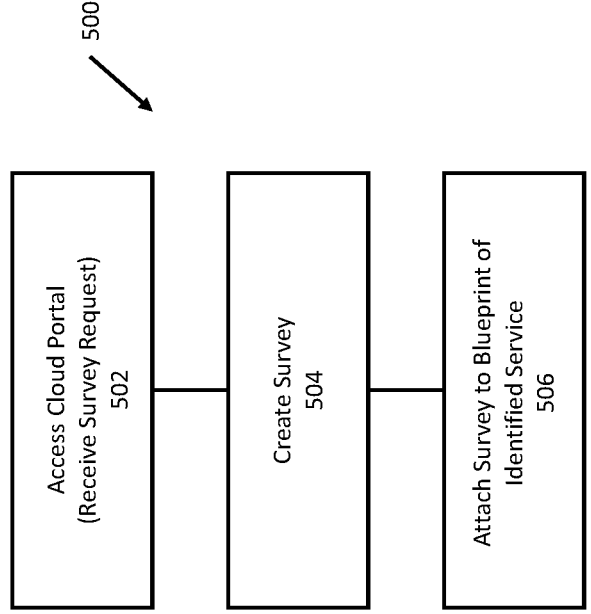
FIG. 5 illustrates an example of a method for creating a survey used in provisioning a request for services.

FIG. 5 is an example of a flow diagram for creating a survey. The method 500 may begin when the cloud is accessed in block 502 or a request to create a survey is received. The cloud may be accessed via a portal that presents a user interface to the requestor, who may be a security administrator in this example. The survey request may be to create a new survey or amend an existing survey. When the survey request is received, the survey generator module creates or amends the survey based on input from the requester. In one example, the survey request may also identify the service associated with the survey being created or amended.

In block 504, the survey is created (or amended). Creating the survey may include presenting a user interface to the user in which questions, answers, and/or actions are received as input in appropriate data entry fields. If the survey is being amended, the existing questions, answers, and/or actions may be displayed and may be edited. In one example, a default list of actions may be presented in a menu in the user interface and the requestor may select one of the actions to be associated with an answer. Block provisioning, email "recipient", delay provisioning request, or the like are examples of actions that may be associated with the answers.

In block 506, the created survey is attached to the blueprint of the identified service. In other words, once the questions, answers, and actions have been inputted, the survey is saved and associated with the appropriate blueprint, which may also be identified in the user interface in which the questions, answers, and actions are provided. The may include incorporating the survey, by way of example, into the custom properties of the blueprint of the requested service. By incorporating the survey into the blueprint, instances of the service that are provisioned will include these properties or will include results of the survey. Specific survey results are not usually stored with the blueprint.

Figure 6:
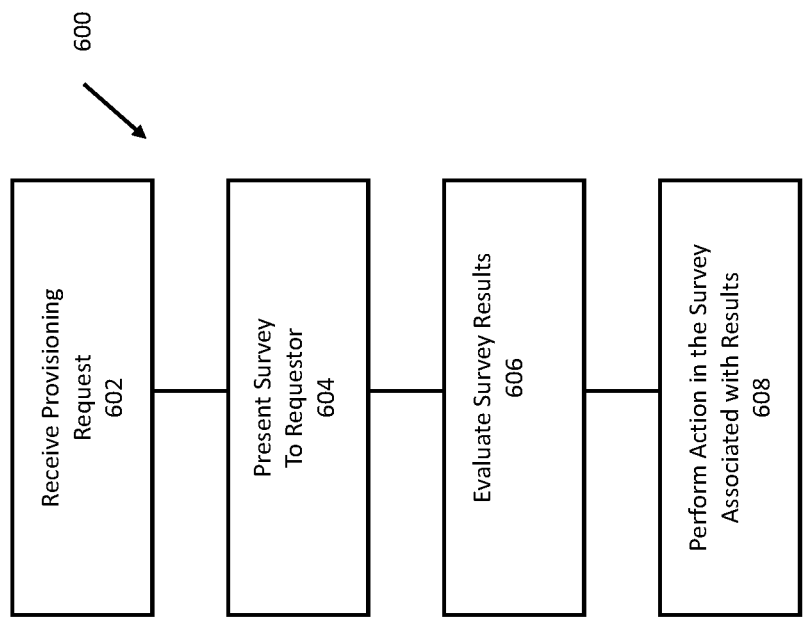
FIG. 6 illustrates an example of a method for evaluating a request for a service of the cloud.

FIG. 6 illustrates an example of a method 600 for provisioning a service. In block 602, a provisioning request is received at the cloud from a client or user. The provisioning request may be received via a user interface to the cloud. The provisioning request may identify the service (e.g., provision a virtual machine, add storage, start an application). When the provisioning request is received at the cloud, the survey for the requested service may be presented to the user in box 604 by, for example, the security execution module. In particular, the survey is extracted from the blueprint of the requested service and presented to the requestor in the user interface. The responses of the requestor are captured through the user interface and stored as results of the survey.

In box 606, the results of the survey are evaluated. This may include identifying any actions associated with the responses (the selected answers). The results of the survey (or responses selected by the user) are stored in the properties of the provisioned service if the provisioning request is granted.

In box 608, the actions associated with the responses or results of the survey are performed. The actions may include multiple actions and may be performed concurrently or in sequence. Absent an action to the contrary, the provisioning request is granted and the service is provisioned.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for provisioning a service in a cloud environment, the method comprising:
receiving, by a processor, a request from a requestor to create a survey in a cloud for a service provided by the cloud;
generating, by the processor, a user interface based on the request;
entering information into the survey that is presented in the user interface by the processor, wherein the information includes questions, answers associated with the questions, and actions associated with the answers;
attaching, by the processor, the survey to a blueprint of the service after the survey is completed; and
automatically provisioning the service based on responses to the survey received from a user of the service during a provisioning request.

2. The method of claim 1, further comprising including the responses in instances of the service that are provisioned as properties.

3. The method of claim 1, wherein automatically provisioning the service includes denying the service to the user when indicated by the responses.

4. The method of claim 1, further comprising automating security responses based on the responses from the user.

5. The method of claim 4, wherein automating security responses include blocking the provisioning request, sending an email to a designated recipient, fulfilling the provisioning request, or partially filling the provisioning request.

6. The method of claim 1, further comprising presenting the user interface to the requestor in response to the request from the requestor, wherein the user interface includes data entry fields for questions, data entry fields for answers, and data entry fields for actions associated with the answers.

7. The method of claim 1, further comprising converting the information entered into the survey into properties of the blueprint.

8. The method of claim 1, further comprising amending the survey attached to the blueprint.

9. The method of claim 1, wherein each blueprint included in the cloud is associated with a different survey.

10. A non-transitory computer readable medium comprising computer executable instructions for performing the method of claim 1.

11. A method for provisioning a service in a cloud, the method comprising:
receiving, by a processor, a provisioning request from a requestor to provision a service provided by the cloud;
presenting, by the processor, a survey to the requestor in a user interface in response to the provisioning request, wherein information included in the survey includes questions and a plurality of selectable answers associated with the questions, wherein the survey is associated with a blueprint for the requested service;

receiving, by the processor, input from the requestor through the user interface related to the user survey, wherein the input corresponds to selected answers;

evaluating, by the processor, the selected answers to determine results of the survey;

performing, by the processor, actions associated with the selected answers such that the requested service is provisioned or not provisioned in accordance with the results, wherein the requested service, when provisioned, is provisioned in accordance with the blueprint and wherein the requested service is not provisioned when the results do not comply with the applicable rules or regulations.

12. The method of claim 11, wherein the provisioning request identifies the service.

13. The method of claim 12, wherein the service is one of a virtual machine, storage, a server, or an application.

14. The method of claim 11, further comprising extracting the survey from properties of the blueprint associated with the requested service.

15. The method of claim 14, wherein the properties include the questions, the answers, and actions to be performed based on the selected answers, the method further comprising presenting the questions and the answers in a multiple choice format.

16. The method of claim 11, further comprising executing the survey prior to provisioning the service.

17. The method of claim 11, further comprising identifying the actions associated with the responses to the questions included in the results.

18. The method of claim 17, wherein the actions include at least one of granting the provisioning request, blocking the provisioning request, partially granting the provisioning request, or sending an email to a specified recipient.

19. The method of claim 11, further comprising saving the results as metadata in an instance of the provisioned service.

20. A non-transitory computer readable medium comprising computer executable instructions for performing the method of claim 11.

* * * * *